No. 851,981. PATENTED APR. 30, 1907.
J. CLOOS.
PRESSURE REDUCING VALVE.
APPLICATION FILED AUG. 6, 1906.
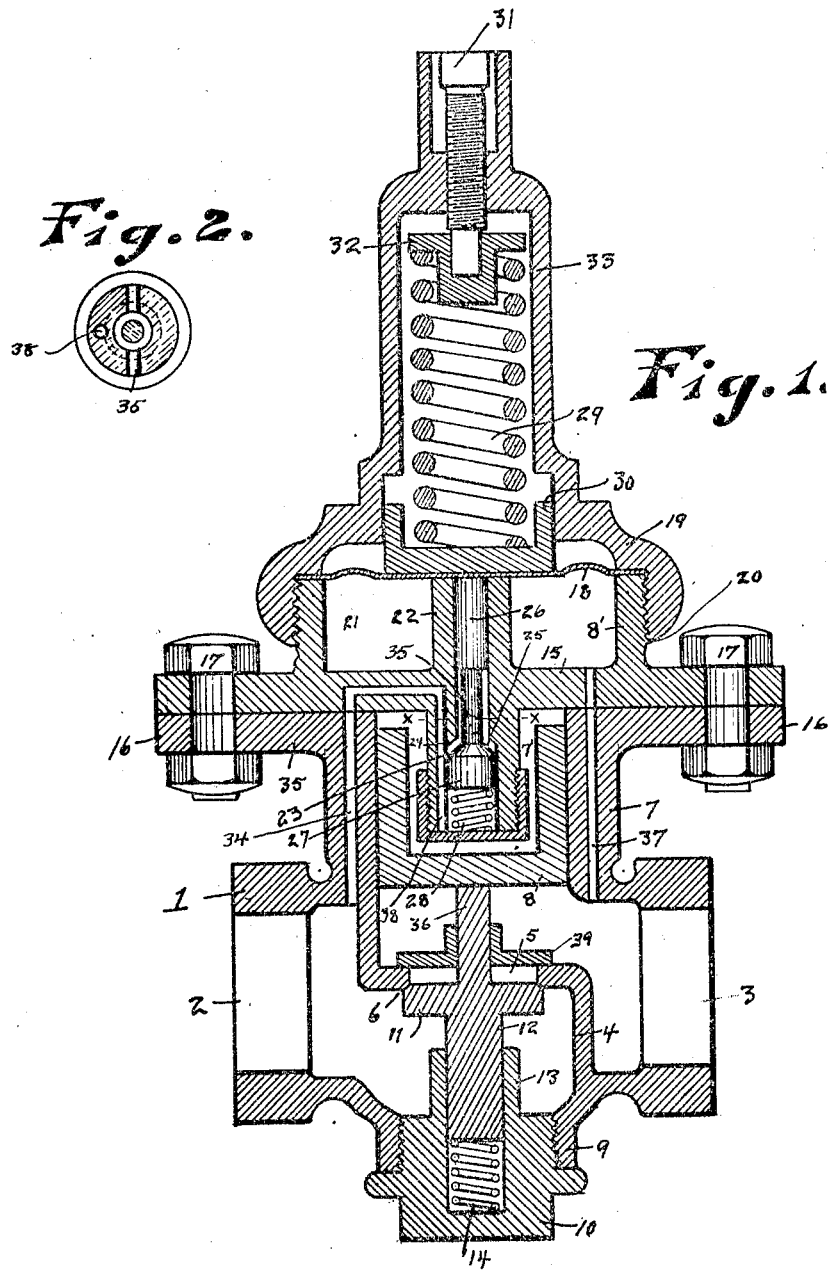

UNITED STATES PATENT OFFICE.

JACOB CLOOS, OF MILWAUKEE, WISCONSIN.

PRESSURE-REDUCING VALVE

No. 851,981.  Specification of Letters Patent.  Patented April 30, 1907.

Application filed August 6, 1906. Serial No. 329,293.

*To all whom it may concern:*

Be it known that I, JACOB CLOOS, a citizen of the United States, residing at the city of Milwaukee, county of Milwaukee, and State of Wisconsin, have invented new and useful Improvements in Pressure-Reducing Valves, of which the following is a specification.

My invention relates to improvements in pressure regulators and it pertains to that class which are adapted to be used for reducing the pressure of steam, compressed air or other fluid under pressure to any desired predetermined pressure below that of the initial pressure.

The object of my invention is not only to provide a more simple and efficient device for regulating the pressure of fluid than has heretofore been made but also to provide a device by which a closer regulation may be attained and a less variation in pressure produced when the primary pressure controlling valve is opened and closed, regardless of the initial or final pressure.

The construction of my device is explained by reference to the accompanying drawings, in which Figure 1 is a longitudinal section thereof, and Fig. 2 is a detail drawn on line X—X of Fig. 1.

Like parts are identified by the same reference figures throughout both views.

My pressure regulator comprises among other things a valve chamber 1 having inlet port 2, outlet port 3, angular partition 4, provided with valve port 5, a valve seat 6, side extension 7, the walls of which extension form a piston chamber 7' for the reception of the piston 8, the opposite side of said chamber 1 being provided with an aperture 9, for the reception of thee hambered plug 10. The valve port 5 is closed by the valve 11, the stem 12 of which has guided bearings in the chamber 13 of said plug, whereby the valve is held in place and guided to and from its seat. 14 is a light spiral spring interposed between the lower end of said valve and the opposing wall of said inclosing chamber and serves to throw said valve to its seat in which position it is more firmly retained by the pressure of the fluid against it. The plug 10 is held in place by an ordinary screw thread formed in the wall of the aperture 9. The outer end of the piston chamber 7' is closed by a partition 15 which is held in place against the annular shoulder 16 by a plurality of bolts 17. The outer end of the side extension 8' is closed by a flexible diaphragm 18 which is held in place by the retaining cap 19, which cap is in turn secured to the walls of the side extension by a screw threaded joint 20 or in any suitable manner. When the diaphragm 18 and cap 19 are in place a so-called diaphragm chamber 21 is formed between the partition 15 and said diaphragm. The partition 15 is provided upon one side with a transverse sleeve 22 extending toward the diaphragm 18 for the reception of one end of the auxiliary valve 23 and upon its opposite side with a sleeve 24 for the reception of the opposite end of said valve. A valve seat 25 is formed at the junction of the sleeves 22 and 24, which is adapted to be closed by said auxiliary valve 23.

The valve 23 is formed with cylindrical ends 26 and 27 which are nicely fitted to the walls of the respective sleeves 22 and 24 and serve to guide the valve 23 to and from its seat. The valve 23 is normally held open against the closing spring 28 by the diaphragm 18 and is permitted to close only when the diaphragm is thrown back by fluid pressure in the diaphragm chamber 21. The diaphragm 18 is held down against the protruding end of the valve 23 by the spiral spring 29 acting through the slidable bearing 30. Any desired pressure may be applied to said spring 29 and from thence to the diaphragm through the adjusting screw 31 acting through the interposed socket 32, which socket is carried by the spring. It will be obvious that by turning said screw 31 toward or from the spring 29 the tension of said spring may be increased or diminished and any desired predetermined pressure applied thereby to said diaphragm. The screw 31 is supported from the cap 19 by the tubular extension 33. Steam or other fluid under pressure is led from the inlet port 2 to the piston chamber 7' through the duct 34, sleeve 24 and transverse aperture 35', whereby pressure is created in said chamber 7' against the piston 8, and said piston 8 is moved downwardly against the protruding stem 36 of said valve 11, when, owing to the fact that the area of the piston 8 acted against by said pressure is greater than the area of the valve 11 which is retained against its seat by the same pressure said valve 11 will be forced downwardly by said piston away from its seat when steam or other fluid under pressure will be free to pass said valve to the outlet port 3 and from thence through suitable ducts to the place of consumption or use. 37 is a duct communicating from the outlet or low pressure side of the valve with the diaphragm chamber 21. Thus it will be obvious that when steam or other fluid under pressure has reached a predetermined pressure upon the outlet side of said regulator, it will flow through said duct 37 into the diaphragm chamber when it will act against the diaphragm 18, when said diaphragm 18 will be thrown upwardly against the recoil of the spring 29 and thus relieve the pressure against the upper end of the valve 23 when said valve 23 will be closed by the recoil of the spring 28 co-operating with the fluid pressure beneath it thereby closing the inlet port or duct 34 and relieving the piston 8 from further pressure from above. Being thus relieved from further pressure said piston will move upwardly, thus permitting the valve 11 to close with the pressure, when it will remain closed until the predetermined pressure upon the outlet side of the regulator has been reduced when said diaphragm 18 will be thrown back by the recoil of said spring 29, whereby said valve 23 will be again opened when the required pressure will be again applied to said piston 8 for again opening the valve 11. It will be understood that the piston 8 is loosely fitted in its bearings, whereby the fluid located above the same is permitted to gradually escape therefrom, and thus permit the return movement of the piston. Thus it will be obvious that assuming the initial pressure in a boiler to be 100 pounds and that it is desirous to use the steam in the heating system at a pressure of five pounds, the screw 31 will be adjusted in such a position against the spring 29 that as soon as the pressure in the heating system has reached and exceeded five pounds said diaphragm 18 will be thrown outward by the pressure of steam in the diaphragm chamber which has entered it through the duct 37, whereby the pressure would be prevented from exceeding the predetermined pressure of five pounds in the heating system. When, however, the pressure in the heating system has dropped below five pounds said diaphragm will be thrown down as previously stated by the recoil of said spiral spring. When acting through said valve the inlet port 34 communicating therewith will again be opened. The piston 8 will be again thrown downward against the valve stem 36 and the steam controlling valve will be again opened and steam will be again admitted past said valve through the heating system until the desired pressure of five pounds is again reached. Thus it is obvious that any desired predetermined pressure below normal initial pressure may be maintained in the heating system by the adjustment of said screw 31 with greater or less pressure against said spring 29.

To prevent too sudden or great a variation in pressure between the inlet and exhaust sides of the regulator when the steam controlling valve 11 is open the end of the auxiliary valve 23 is made cylindrical in shape and to closely fit the inclosing sleeve 24 on all sides with the exception of a small semi-circular aperture 38 formed at one side of said valve in the inclosing walls of the sleeve, whereby when said valve 23 is open the escape of steam instead of passing through an area equal to the area of the valve and seat it is free to escape only through said semi-circular side passage 38 when it passes beneath said valve 23 and out through said transverse aperture 35', whereby the passage of steam in the piston chamber 7' is retarded, and the excessive variation of pressure caused by the movement of said valve which might otherwise occur is avoided.

39 is an impact or deflecting shield slidably supported upon the valve stem 36 in front of the port 5 and serves to prevent the impact of steam, as it enters said port, against the opposing side of said piston.

Having thus described my invention what I claim as new and desire to secure by Letters Patent is,

1. In a pressure regulator of the class described, the combination of a valve chamber provided with inlet and outlet ports, a partition interposed between said ports provided with a valve port, a main fluid controlling valve adapted to close said valve port with the initial pressure in said regulator, means for guiding said valve to and from its seat, means for normally holding said valve in its closed position, means actuated by the initial pressure for temporarily opening said main valve against such pressure, a slidable impact shield located in front of said main fluid controlling valve adapted to deflect the current of the fluid as it passes said valve, means actuated by the fluid at a predetermined reduced pressure for actuating an auxiliary valve which controls the initial pressure by which said main valve is opened, and means for regulating the resistance to the closing movement of the auxiliary valve, whereby the pressure of the fluid which has passed through said main controlling valve may be retained at any desired predetermined pressure below the initial pressure, substantially as set forth.

2. In a pressure regulator of the class described, the combination of a valve chamber provided with inlet and outlet ports, a partition interposed between said ports provided with a valve port, a main fluid controlling valve adapted to close said port with the initial pressure, means for guiding said valve to and from its seat, means for normally holding said valve to its seat, a piston chamber and piston located in said chamber in contact with the protruding stem of said valve, a fluid duct communicating from the initial side of said regulator with said piston chamber, an auxiliary valve for controlling the passage of fluid through said duct, said auxiliary valve having longitudinal projections above and below its seat closely fitted to its inclosing sleeves, a longitudinal duct formed in the side of the valve inclosing sleeve for the passage of the fluid beneath said auxiliary valve, a transverse duct communicating from the valve inclosing sleeve to the inclosing piston chamber; a diaphragm adapted to normally retain said auxiliary valve in its open position, a duct communicating from the outlet side of said regulator to the diaphragm chamber, said diaphragm being adapted when the predetermined pressure upon the outlet side of said regulator is exceeded to be forced back from the stem of said auxiliary valve, said valve permitted to close, and the pressure above said valve controlling piston to be excluded, whereby said main controlling valve will be permitted to close with the pressure, and means for increasing or diminishing the resistance to said diaphragm, whereby the movement of said diaphragm and auxiliary valve may be regulated and the predetermined pressure upon the outlet side of said regulator may be increased or diminished as desired.

3. In a pressure regulator of the class described, the combination of a valve chamber provided with inlet and outlet ports, a partition interposed between said ports provided with a valve port, a main fluid controlling valve adapted to close said port with the initial pressure, means for guiding said valve to and from its seat, a spiral spring located beneath the stem of said valve and adapted to normally hold the same to its seat, a piston chamber located above said valve, a piston located in said chamber in contact with the protruding stem of said valve, a fluid duct communicating from the initial side of said regulator with said piston chamber through an aperture formed within its walls, an auxiliary valve for controlling the passage of steam through said duct having longitudinal projections above and below its seat and closely fitted to its inclosing walls, the walls of said valve being provided with a longitudinal duct for the passage of fluid under pressure beneath said auxiliary valve and a transverse duct communicating from said valve inclosing sleeve with said piston chamber, a diaphragm adapted to normally retain said auxiliary valve in its open position, a duct communicating through the walls of said piston chamber from the outlet side of said regulator, a spiral spring located above said diaphragm in an inclosing chamber, an adjusting screw having screw threaded bearings above said spiral spring in its inclosing walls, said adjusting screw serving as a means of regulating the tension of said spring, means for communicating motion from said spring through said diaphragm to the fluid controlling valve, all substantially as and for the purpose specified.

In testimony whereof I affix my signature in the presence of two witnesses.

JACOB CLOOS.

Witnesses:
 JAS. B. ERWIN,
 O. R. ERWIN.